July 13, 1954 — L. J. DUDLEY — 2,683,323

FISHING LURE

Filed Nov. 10, 1951

INVENTOR.
LUTHER J. DUDLEY
BY
*Jennings & Carter*
ATTORNEYS

Patented July 13, 1954

2,683,323

UNITED STATES PATENT OFFICE 2,683,323

FISHING LURE

Luther J. Dudley, Fayette, Ala.

Application November 10, 1951, Serial No. 255,847

5 Claims. (Cl. 43—42.25)

This invention relates to a fishing lure, and has for an object the provision of a dry fly type of lure which shall, in combination with a resilient leader be adapted to turn over and over on the water after being cast without any further action on the part of the fisherman.

Another object of my invention is to provide a fishing lure of the character designated together with a resilient leader, the lure being provided with oppositely sloped vanes on the sides thereof adapted to cause the lure to rotate about its longitudinal axis as it is being cast thus causing the resilient leader to twist before the lure lights on the water.

A further object of my invention is to provide a fishing lure of the character designated together with a resilient leader and a relatively heavy line and in which only the resilient leader is twisted when a cast is being made, thus preventing the fly line from becoming twisted and tangled.

Heretofore, in the art to which my invention relates, spinners have been applied on casting plugs and flies which rotate as the lures are pulled through the water. So far as I am aware, vanes have never been applied to a light dry fly to cause rotation thereof as it is cast through the air. Neither, so far as I am aware has such a fly been connected to a relatively heavy fly line by means of a light resilient leader so as to permit the leader to twist prior to landing on the water and untwist after landing on the water. In accordance with my invention, I do provide such a lure which, after being cast and while lying on the water is caused to rotate solely by the untwisting of the leader.

A fishing lure embodying features of my invention is illustrated in the accompanying drawings forming a part of this application in which.

Figure 1:
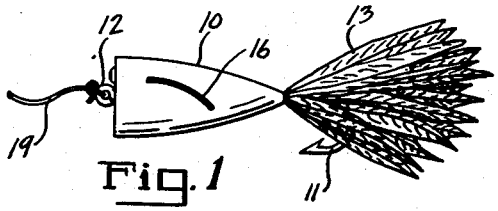
Fig. 1 is a side elevational view thereof.
Figure 2:
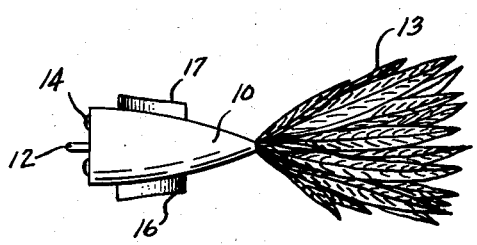
Fig. 2 is a plan view.
Figure 3:
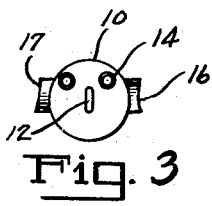
Fig. 3 is a front elevational view.

Referring now to the drawings for a better understanding of my invention, the fishing lure comprises a very light body 10 made of cork or other such light material which is preferably tapered toward the rear thereof. Extending through the body 10 and secured thereto in a manner well understood is a fishing hook 11 having an eye 12. A plurality of feathers 13 may surround the shank of the hook and be secured thereto and to the body of the lure by any suitable means. The lure may also be provided with the usual simulated eyes 14 so as to give the lure the appearance of a live fly or bug.

Secured to the body 10 of the lure on opposite sides thereof are relatively stiff laterally projecting vanes 16 and 17. As viewed in Figs. 1 and 4, the vanes 16 and 17 are angularly directed or sloped in opposite directions. In other words, the vane 16 slopes downwardly and rearwardly while the vane 17 slopes upwardly and rearwardly. It will be apparent that the vane 16 may slope upwardly and rearwardly and the vane 17 slope downwardly and rearwardly.

Connecting the eye 12 of the hook to a relatively heavy fly line 18 is a relatively light resilient leader 19. I have found in actual practice that a resilient nylon leader of approximately 8 pounds test and having a length of from 5 to 8 feet is satisfactory in every respect. The line 18 is preferably of a size C or heavier so as to prevent twisting of the line when the lure twists the resilient leader 19.

In use, one end of a relatively light resilient leader 19 of the desired length is secured to the eye 12 of the hook 11. The other end of the leader 19 is secured to the fly line 18. It will be noted that no swivel is employed to connect the leader to the lure or to the line.

Figure 4:
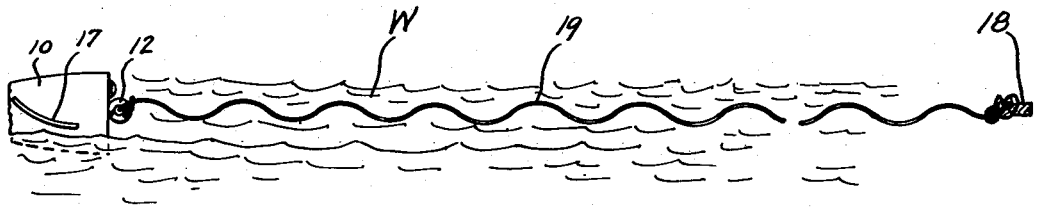
Fig. 4 is a side elevational view, showing a portion of the lure and the manner of connecting the lure to a fly line.

Upon the back cast and upon the forward cast by the fisherman, the lure is caused to rotate in the air due to the resistance of the air against the vanes 16 and 17 thus twisting the leader 19 prior to landing on the water W, as shown in Fig. 4. Since a relatively heavy fly line 18 is employed it does not twist. When the lure lights on the water, without any further action by the fisherman, the resilient leader 19 untwists itself causing the lure to turn over and over on the water, thus simulating the struggle of a bug or fly after alighting on the water. A slight pull on the line will cause the leader to untwist further, thus causing further rotation of the lure. As will be seen in Fig. 4 the lure floats on the water W so that the vanes 16 and 17 are practically out of engagement with the water and the only force bringing about rotation of the lure is the untwisting of the leader 19.

From the foregoing it will be apparent that I have devised an improved fishing lure of the dry fly type which, in combination with a relatively heavy line and a resilient leader, simulates the action of a live bug or fly on the water.

While I have shown my invention in but one form, it will be obvious to those skilled in the art that it is not so limited, but is susceptible of various changes and modifications without departing from the spirit thereof, and I desire,

What I claim is:

1. The combination with a dry fly type fishing lure and a relatively heavy fly line, of a relatively light resilient leader non-rotatably connecting said lure to said line, and laterally extending oppositely sloped vanes on opposite sides of said lure causing said lure and said leader to rotate as they are cast through the air thus twisting the leader prior to the alighting of the fly and leader on the water whereby reverse twisting of the leader and fly occurs while they are lying on the water.

2. The combination set forth in claim 1 in which the leader is approximately 8 pounds test and the fly line is of a size C or larger.

3. The combination with a dry fly fishing lure and a relatively heavy fly line, of a relatively light resilient leader non-rotatably connecting said lure to said line, a relatively stiff laterally extending downwardly and rearwardly sloping vane secured to one side of said lure, and a relatively stiff laterally extending upwardly and rearwardly sloping vane secured to the other side of said body, said vanes causing the lure and said leader to rotate upon movement thereof relative to air.

4. The combination with a dry fly type fishing lure and a relatively heavy fly line, of a resilient leader non-rotatably connecting said lure to said line, and angularly directed vane means on said lure causing the lure and said leader to rotate in the air as the lure is cast during fly fishing thus winding substantially only the resilient leader prior to the alighting of the same on the water, whereby subsequent unwinding of the leader causes the fly to move in the water in simulation of a natural fly or the like.

5. The combination of a fishing lure of the dry fly type comprising a body, a hook secured to said body, a relatively stiff laterally extending downwardly and rearwardly sloping vane secured to one side of said body, a relatively stiff laterally extending upwardly and rearwardly sloping vane secured to the other side of said body, a fly line of at least C size, and a resilient leader of approximately eight pounds test non-rotatably connecting the forward end of said lure to said fly line, said vanes causing the lure and said leader to rotate upon movement thereof relative to air, whereby upon casting the fly on water unwinding of the leader causes the fly to move on the water.

References Cited in the file of this patent

UNITED STATES PATENTS

| Number | Name | Date |
| --- | --- | --- |
| 1,561,512 | Fredricks | Nov. 17, 1925 |
| 1,914,174 | Smith | June 13, 1933 |
| 1,975,218 | Worden | Oct. 2, 1934 |
| 2,218,946 | Barnett | Oct. 22, 1940 |
| 2,250,832 | Hedge | July 29, 1941 |

FOREIGN PATENTS

| Number | Country | Date |
| --- | --- | --- |
| 3,007 | Great Britain | 1889 |